(12) United States Patent
Ikeda

(10) Patent No.: US 8,994,968 B2
(45) Date of Patent: Mar. 31, 2015

(54) IMAGE FORMING APPARATUS WHICH IS CAPABLE OF DISPLAYING REAL SIZE PREVIEW, METHOD OF CONTROLLING THE SAME, AND STORAGE MEDIUM

(75) Inventor: Motoki Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 13/593,543

(22) Filed: Aug. 24, 2012

(65) Prior Publication Data

US 2013/0050732 A1    Feb. 28, 2013

(30) Foreign Application Priority Data

Aug. 31, 2011 (JP) ................................. 2011-188978

(51) Int. Cl.
G06F 3/12 (2006.01)
H04N 1/00 (2006.01)
H04N 1/32 (2006.01)

(52) U.S. Cl.
CPC ......... *H04N 1/00411* (2013.01); *H04N 1/0044* (2013.01); *H04N 1/00482* (2013.01); *H04N 1/32042* (2013.01); *H04N 1/32053* (2013.01); *H04N 1/32096* (2013.01); *H04N 2201/33321* (2013.01); *H04N 2201/0082* (2013.01)
USPC ......... 358/1.13; 358/1.14; 358/1.15; 358/1.1; 715/252; 715/274; 715/788; 715/800; 715/815

(58) Field of Classification Search
USPC ........ 358/1.13, 1.14, 1.15, 1.1; 715/252, 274, 715/788, 800, 815
See application file for complete search history.

(56) References Cited

U.S. PATENT DOCUMENTS 5,963,216 A * 10/1999 Chiarabini et al. ........... 345/660
2008/0252922 A1* 10/2008 Ikegami et al. ............... 358/1.15

FOREIGN PATENT DOCUMENTS

| CN | 1848902 A | 10/2006 |
| CN | 101729718 A | 6/2010 |
| CN | 101901107 A | 12/2010 |
| JP | 2001-166763 | 6/2001 |

OTHER PUBLICATIONS

Kobayashi et al., Information Processor, Control Method Thereof, Storage Medium, and Program, Aug. 3, 2006, (JP 2006202112 A).*
Chinese Office Action issued in corresponding application No. 201210309905.8 on Sep. 15, 2014.

* cited by examiner

*Primary Examiner* — Martin Mushambo
(74) *Attorney, Agent, or Firm* — Carter, DeLuca, Farrell & Schmidt, LLP

(57) ABSTRACT

An image forming apparatus that is capable of displaying a real size preview and reduces user's time and effort required for forming the image on the recording medium. The image forming apparatus includes a printing unit which forms an image on a recording medium, and a user interface for displaying information to a user. A real size preview image is displayed on the user interface. A display magnification slider is used for enabling a user to change a display magnification of the image displayed on the user interface. A controller unit selects a size of the recording medium on which the image is to be formed, based on the display size changed by the user. A printing unit forms the image on the recording medium having the selected size.

18 Claims, 4 Drawing Sheets

| ORIGINAL SIZE | MAGNIFICATION | OPTIMUM SHEET SIZE | OPTIMUM PAGE AGGREGATION |
|---|---|---|---|
| A3 | 86 | B4 | |
| A3 | 70 | A4 | 2 in 1 |
| A3 | 61 | B5 | |
| A3 | 50 | A5 | 4 in 1 |
| A3 | 35 | | 8 in 1 |
| B4 | 115 | A3 | |
| B4 | 81 | A4 | |
| B4 | 70 | B5 | 2 in 1 |
| B4 | 50 | | 4 in 1 |
| B4 | 35 | | 8 in 1 |
| A4 | 141 | A3 | |
| A4 | 122 | B4 | |
| A4 | 86 | B5 | |
| A4 | 70 | | 2 in 1 |
| A4 | 50 | | 4 in 1 |
| A4 | 35 | | 8 in 1 |

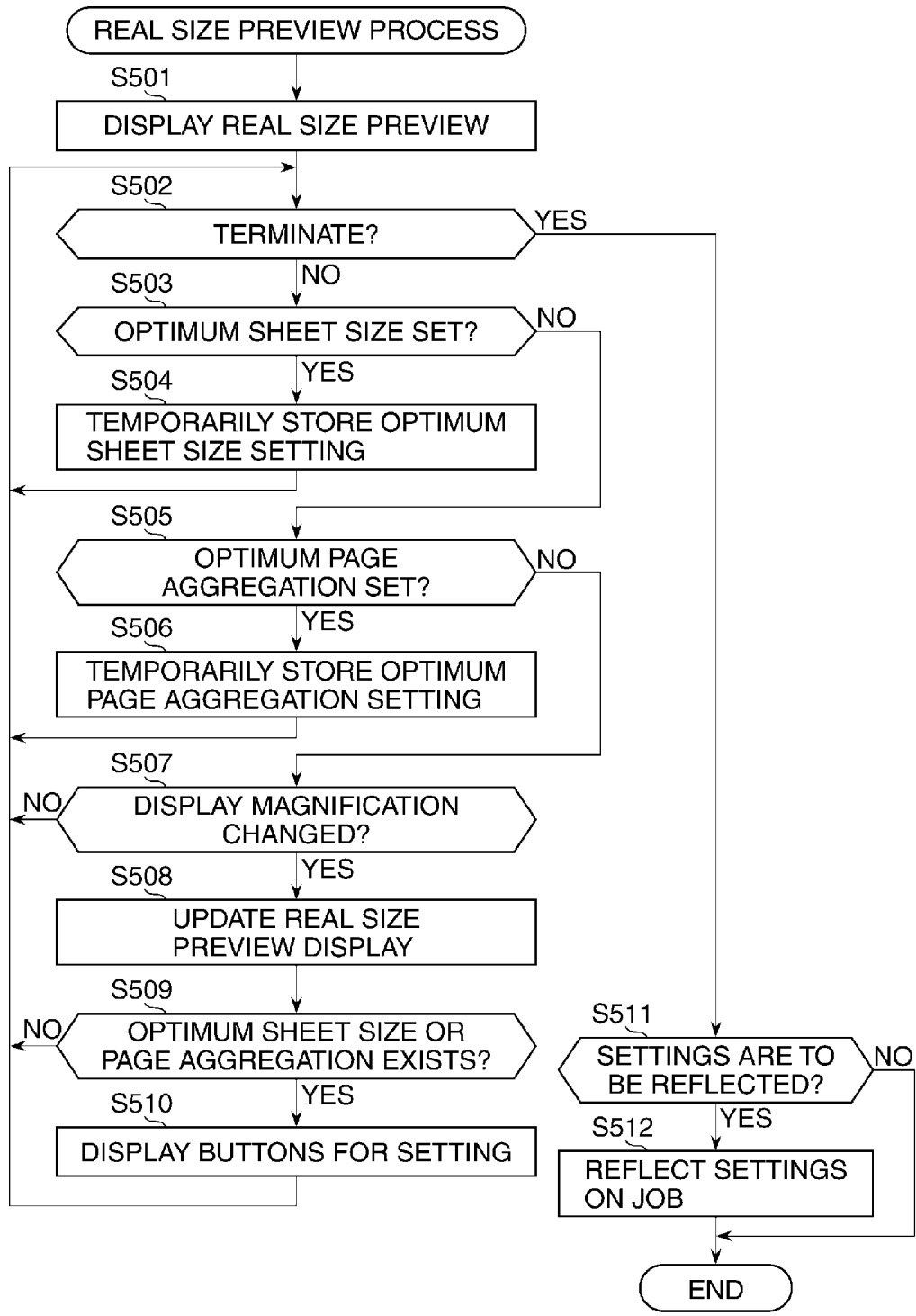

IMAGE FORMING APPARATUS WHICH IS CAPABLE OF DISPLAYING REAL SIZE PREVIEW, METHOD OF CONTROLLING THE SAME, AND STORAGE MEDIUM

BACKGROUND OF THE INVENTION

1. Field of the Invention

The present invention relates to an image forming apparatus, a method of controlling the image forming apparatus, and a storage medium, and more particularly to an image forming apparatus that is capable of displaying real size preview in which an image is displayed in the same size as the image to be formed on a recording medium, a method of controlling the image forming apparatus, and a storage medium.

2. Description of the Related Art

From an viewpoint of environmental protection, paperless work has been promoted e.g. in offices. In image forming apparatuses, such as a multifunction peripheral, a preview function is provided in order to reduce print errors. As one of the above-mentioned preview function, there has been proposed a technique in which characters and graphics included in an image to be printed are displayed in the same size as the image to be actually printed on a sheet for user confirmation (see e.g. Japanese Patent Laid-Open Publication No. 2001-166763). The above-mentioned preview function is hereinafter referred to as "real size preview".

According to this technique, it is possible to confirm the size of characters and graphics before printing, and hence it is possible to prevent a print error from occurring due to a reason that "the characters and graphics on the printed image are not printed in the intended size".

However, as a result of confirmation of the size of characters and graphics using real size preview, if the characters and graphics are not of the desired size, to print the image in the desired size, the user is required to perform the following troublesome operations: First, the user closes a preview screen. Next, the user opens a screen for setting printing magnification, and sets the printing magnification. Then, the user opens the preview screen again to confirm the size of characters and graphics by real size preview.

Further, after performing the above-mentioned operations, as a result of confirmation of the print image, the user sometimes recognizes that the size of a sheet or the page aggregation (imposition) is not properly set. Examples of improper sheet size and page aggregation include a case where the contents to be printed are cut because the size of the sheet is too small relative to the printing magnification, or a case where a margin area is unnecessarily large.

In this case, it is necessary to perform the following troublesome additional operations: First, the user closes the preview screen. Next, the user opens screens for setting sheet selection and page aggregation, and makes these settings. Then, the user opens the preview screen again to confirm the print image.

SUMMARY OF THE INVENTION

The present invention provides an image forming apparatus which is capable of displaying a real size preview in which an image is displayed in the same size as the image to be formed on a recording medium, and reduces user's time and effort required for forming the image on the recording medium, a method of controlling the image forming apparatus, and a storage medium.

In a first aspect of the present invention, there is provided an image forming apparatus including a forming unit configured to form an image on a recording medium, and a display unit configured to display information, comprising a real size preview unit configured to display the image on the display unit in the same size as a size of an image to be formed on a recording medium, a changing unit configured to enable a user to change a display size of the image displayed on the display unit by the real size preview unit, and a selection unit configured to select a size of the recording medium on which the image is to be formed, based on the display size changed by the changing unit, wherein the forming unit forms the image on the recording medium having the size selected by the selection unit.

In a second aspect of the present invention, there is provided an image forming apparatus that includes a display unit configured to display information, and can communicate with a forming unit configured to form an image on a recording medium, comprising a real size preview unit configured to display the image on the display unit in the same size as a size of an image to be formed on a recording medium, a changing unit configured to enable a user to change a display size of the image displayed on the display unit by the real size preview unit, a selection unit configured to select a size of the recording medium on which the image is to be formed, based on the display size changed by the changing unit, and a control unit configured to cause the forming unit to form the image on the recording medium having the size selected by the selection unit.

In a third aspect of the present invention, there is provided a method of controlling an image forming apparatus including a forming unit configured to form an image on a recording medium, and a display unit configured to display information, comprising displaying the image on the display unit in the same size as a size of an image to be formed on a recording medium, enabling a user to change a display size of the image displayed on the display unit by the displaying, selecting a size of the recording medium on which the image is to be formed, based on a display size changed by the user, and causing the forming unit to form the image on the recording medium having the size selected by the selecting.

In a fourth aspect of the present invention, there is provided a method of controlling an image forming apparatus that includes a display unit configured to display information, and can communicate with a forming unit configured to form an image on a recording medium, comprising displaying the image on the display unit in the same size as a size of an image to be formed on a recording medium, enabling a user to change a display size of the image displayed on the display unit by the displaying, selecting a size of the recording medium on which the image is to be formed, based on a display size changed by the user, and causing the forming unit to form the image on the recording medium having the size selected by the selecting.

In a fifth aspect of the present invention, there is provided a non-transitory computer-readable storage medium storing a computer-executable program for causing a computer to execute a method of controlling an image forming apparatus including a forming unit configured to form an image on a recording medium, and a display unit configured to display information, wherein the method comprises displaying the image on the display unit in the same size as a size of an image to be formed on a recording medium, enabling a user to change a display size of the image displayed on the display unit by the displaying, selecting a size of the recording medium on which the image is to be formed, based on a display size changed by the user, and causing the forming unit to form the image on the recording medium having the size selected by the selecting.

In a sixth aspect of the present invention, there is provided a non-transitory computer-readable storage medium storing a computer-executable program for causing a computer to execute a method of controlling an image forming apparatus that includes a display unit configured to display information, and can communicate with a forming unit configured to form an image on a recording medium, wherein the method comprises displaying the image on the display unit in the same size as a size of an image to be formed on a recording medium, enabling a user to change a display size of the image displayed on the display unit by the displaying, selecting a size of the recording medium on which the image is to be formed, based on a display size changed by the user, and causing the forming unit to form the image on the recording medium having the size selected by the selecting.

According to the present invention, in the image forming apparatus which is capable of displaying a real size preview in which an image is displayed in the same size as the image to be formed on a recording medium, the user's time and effort required for forming the image on the recording medium are reduced.

Further features of the present invention will become apparent from the following description of exemplary embodiments with reference to the attached drawings.

BRIEF DESCRIPTION OF THE DRAWINGS

FIG. 5 is a flowchart of a real size preview displaying process executed by a CPU appearing in FIG. 1.

DESCRIPTION OF THE EMBODIMENTS

The present invention will now be described in detail below with reference to the accompanying drawings showing embodiments thereof.

Figure 1:
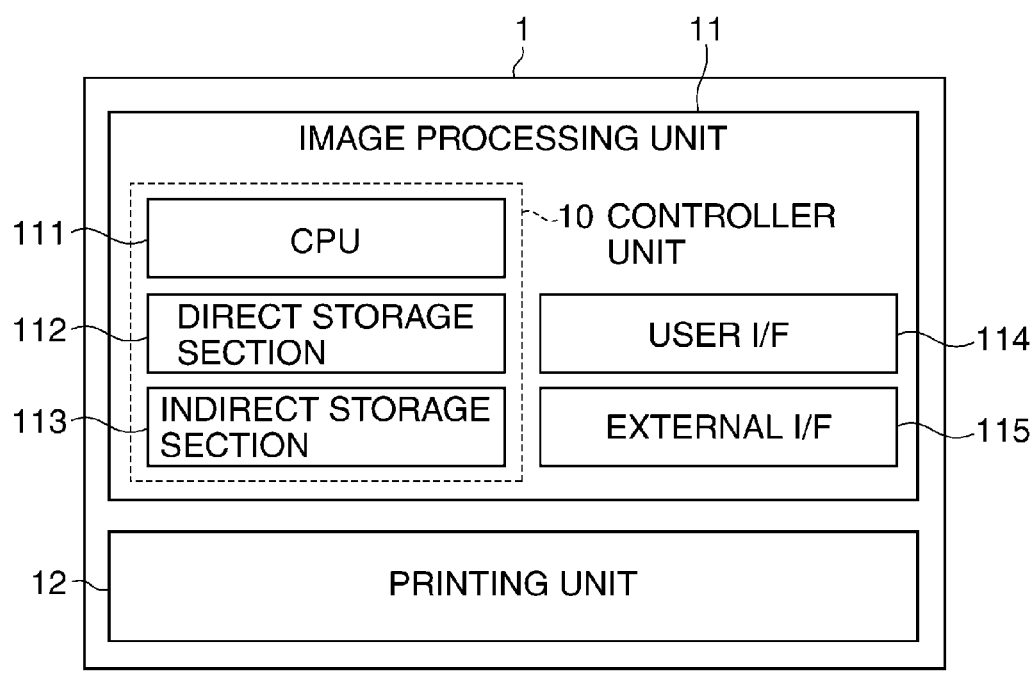
FIG. 1 is a schematic block diagram of an image forming apparatus according to an embodiment of the present invention.

FIG. 1 is a schematic block diagram of an image forming apparatus 1 according to an embodiment of the present invention. In FIG. 1, the image forming apparatus 1 comprises an image processing unit 11 and a printing unit 12. The image processing unit 11 and the printing unit 12 are communicably interconnected.

The image processing unit 11 comprises a CPU 111, a direct storage section 112, an indirect storage section 113, a user interface 114, and an external interface 115. The direct storage section 112 is implemented e.g. by a RAM, and the indirect storage section 113 is implemented e.g. by a HDD. Further, the direct storage section 112 directly exchanges data with the CPU 111, and the indirect storage section 113 exchanges data with the CPU 111 via the direct storage section 112.

The indirect storage section 113 stores a controller program for controlling the image forming apparatus 1. Further, the indirect storage section 113 stores a determination condition table, described hereinafter. Further, the direct storage section 112 temporarily stores information obtained e.g. when the CPU 111 executes the controller program.

The user interface 114 is implemented e.g. by a touch panel, a keyboard, a mouse, and a display, and is capable of receiving instructions from a user, and displaying data. Note that in the following description, an operation in which the user interface 114 outputs display data to the display is described as "the user interface 114 displays the data". The user interface 114 is an example of a display unit that displays information to the user.

The external interface 115 receives data from and transmits data to external devices. For example, the external devices include an external storage device, such as an external HDD or an external USB memory, and a device separate from the image forming apparatus 1, such as a separate host computer or image forming apparatus, connected to the image forming apparatus 1 via a network.

The printing unit 12 forms an image generated by the image processing unit 11 on a recording medium, such as a sheet. In the following description, forming an image is sometimes referred to as "printing". Further, a recording medium is sometimes referred to as a sheet. Furthermore, in the present embodiment, image formation processing and print processing, executed by the image processing unit 11 and the printing unit 12, respectively, are referred to as "jobs". A setting concerning a job is referred to as "a job setting".

The CPU 111 can transfer (store) the controller program stored in the indirect storage section 113 to (in) the direct storage section 112. Upon completion of transfer of the controller program, the CPU 111 is capable of executing the controller program.

Note that in the present embodiment, the CPU 111, and part of the direct storage section 112 and the indirect storage section 113 are referred to as a controller unit 10. The part of the direct storage section 112 and the indirect storage section 113 includes an area of the direct storage section 112 storing the controller program, and an area used for storing information obtained when the CPU 111 executes processing by the controller program.

The user interface 114 receives an instruction from a user for displaying a real size preview. Then, the user interface 114 notifies the controller unit 10 of the received instruction.

Upon receipt of this display instruction, the controller unit 10 generates a real size preview image based on an image read by the image processing unit 11 or an image received by the external interface 115 from an external device.

The real size preview image is a preview image generated such that characters and graphics included in an image to be printed are substantially equal in size to those actually printed on a sheet. The term "substantially equal in size" implies that the equality may include some margin of error.

The controller unit 10 generates display data from the generated real size preview image, and transfers the generated display data to the user interface 114. The user interface 114 displays the transferred display data, whereby a real size preview is displayed.

The user interface 114 accepts a change of display magnification of the real size preview image which is being displayed, from the user. Then, the user interface 114 notifies the controller unit 10 of the accepted change of display magnification. More specifically, the user performs operation (instruction) for changing the size of the real size preview image displayed on the user interface 114, as it looks, and the user interface 114 notifies the changing operation (instruction) to the controller unit 10.

Upon receipt of the operation for changing the display magnification, the controller unit 10 regenerates real size preview image according to the changed display magnification. Then, the controller unit 10 generates display data from the regenerated real size preview image, and passes the generated display data to the user interface 114 to cause the user interface 114 to display the display data.

In the present embodiment, the display magnification which can be accepted by the user interface 114 is an integer value within a range of 25[%] to 400[%]. Further, according to the present embodiment, this display magnification is reflected on printing magnification.

In the present embodiment, magnification associated with a real size preview display is referred to as the "display magnification". Further, magnification used for a print operation included in the job setting is referred to as the "printing magnification". The modification or determination of the display magnification corresponds to modification or determination of the display size. Further, the modification or determination of printing magnification corresponds to modification or determination of the print size, and according to the modification or determination of the print size, the size of a recording medium (e.g. sheet) on which the image is printed is modified or determined.

Figures 2, 3:
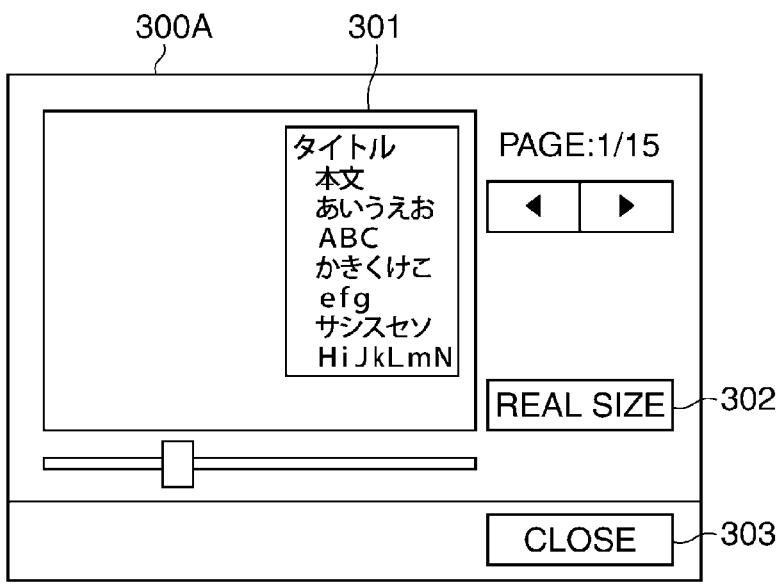
FIG. 2 is a diagram showing the data format of a determination condition table stored in an indirect storage section appearing in FIG. 1.
FIG. 3 is a view showing an example of a preview display on a user interface appearing in FIG. 1.

FIG. 2 is a diagram showing the data format of a determination condition table 200 stored in the indirect storage section 113 appearing in FIG. 1.

The determination condition table 200 is used for defining conditions for determining the optimum sheet size and page aggregation for printing magnification.

In the present embodiment, the display magnification of real size preview is reflected on the printing magnification, and the optimum sheet size and page aggregation at this printing magnification (display magnification) are determined. The determination condition table 200 is a data table which defines the conditions for the above-mentioned determination. In the determination condition table 200, one record (row) represents one condition.

In FIG. 2, a data item 201 indicates an original size (size of an original) which is a size of an image to be printed.

A data item 202 indicates a printing magnification of the original size of the data item 201, which makes it possible to set the optimum sheet size and page aggregation.

A data item 203 indicates the optimum sheet size for the original size indicated by the data item 201 and the printing magnification indicated by the data item 202. When a corresponding box is blank, this indicates that there is no optimum sheet size.

A data item 204 indicates the optimum page aggregation for the original size indicated by the data item 201 and the printing magnification indicated by the data item 202. When a corresponding box is blank, this indicates that there is no optimum page aggregation.

The above-described determination condition table 200 corresponds to changeable size information in which original sizes, which are predetermined sheet sizes for images, and changed display magnifications, are associated with sheet sizes which enable the images to be formed at the changed display magnifications, respectively.

Further, in the determination condition table 200, for use in printing a plurality of images, an original size, i.e. a predetermined sheet size for each image and a changed display magnification are associated with a sheet size which enables two or more images to be formed in an aggregated manner on one sheet at the changed display magnification. Therefore, the determination condition table 200 also corresponds to aggregation-enabling size information.

FIG. 3 is a view showing an example of a preview display on the user interface 114 appearing in FIG. 1.

A screen 300A displays a preview. The preview in FIG. 3 is not real size preview, but preview for enabling the user to take an overall view of the whole page to thereby check the conditions of the page. The screen 300A is displayed by the user interface 114 according to a user's instruction.

A preview display area 301 is used for displaying display data generated from a preview image.

A real-size button 302 is used for instructing to display the real size preview. When the user clicks the real-size button 302, a screen for displaying a real size preview shown in FIG. 4 is displayed.

When the user clicks a "close" button 303, the screen is shifted to a screen displayed before displaying the screen 300A.

Figure 4:
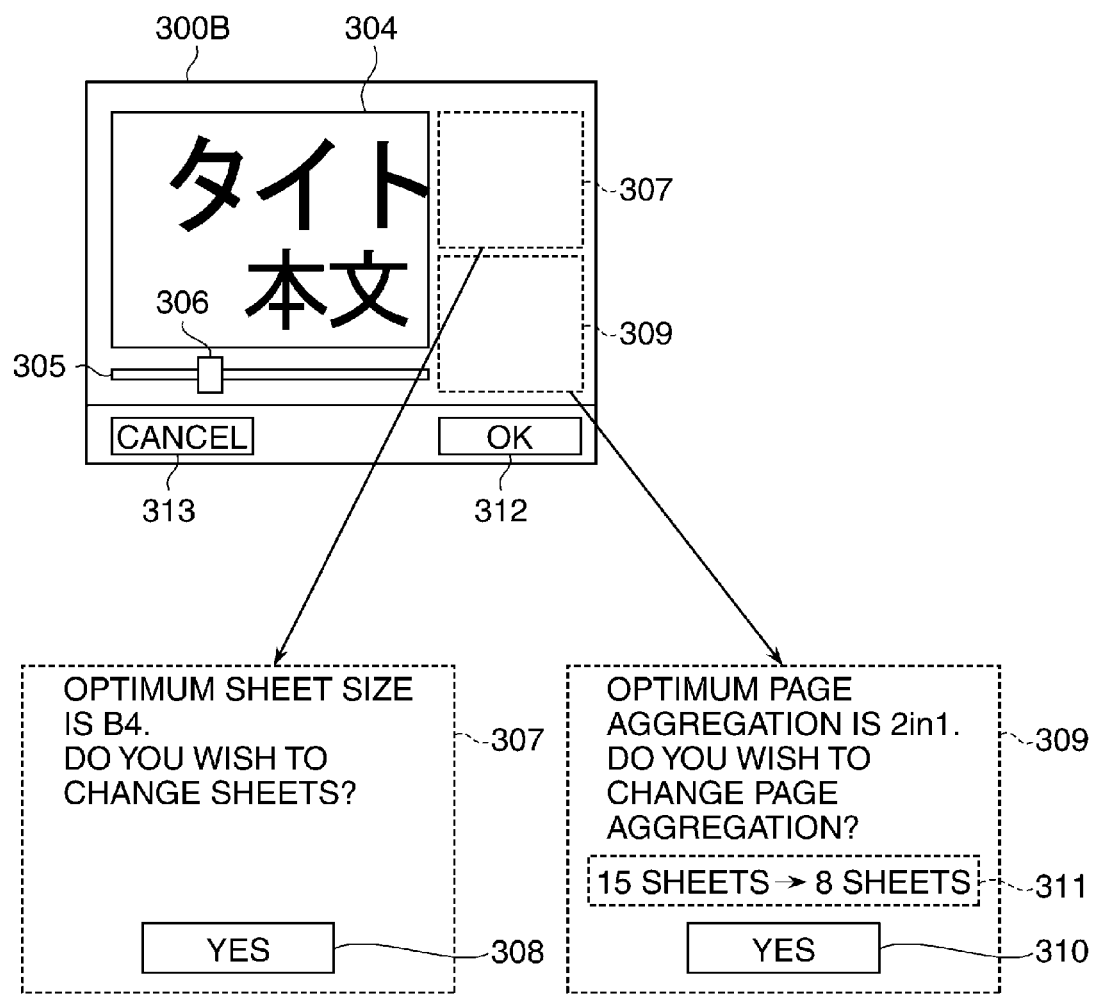
FIG. 4 is a view showing an example of a real size preview display on the user interface appearing in FIG. 1.

FIG. 4 is a view showing an example of a real size preview display on the user interface 114 appearing in FIG. 1.

In FIG. 4, a screen 300B is a screen for displaying a real size preview.

A real size preview display area 304 is used for displaying display data generated from a real size preview image.

A display magnification slider 305 is used for setting a display magnification. By moving a knob 306 to the left, as viewed from the front side of the display, a display magnification for reducing the real size preview display is set. On the other hand, by moving the knob 306 to the right, a display magnification for enlarging the real size preview display is set. According to the operation of the display magnification slider 305, the real size preview image is regenerated to thereby update the display on the real size preview display area 304. The display magnification slider 305 is used for enabling the user to change the display magnification of an image displayed on the user interface 114, i.e. the size (display size) of a displayed image as it looks. The method of changing of the display magnification is not limited to the use of the slider 305, but the changing of the display magnification may be realized by any other methods, including the use of a size increase/reduction button and a method in which a user touches the screen 304 with his/her finger and performs a predetermined gesture, such as pinch-in or pinch-out, insofar as the method enables the user to change the display magnification of a displayed image.

An optimum sheet size-setting display area 307 is used, when it is determined that an optimum sheet size for the current display magnification exists, for displaying a button for setting the optimum sheet size. The above-mentioned current display magnification is reflected on printing magnification afterwards.

If it is determined that no optimum sheet size for the current display magnification exists, nothing is displayed on the optimum sheet size-setting display area 307. If it is determined that an optimum sheet size exists, the optimum sheet size is displayed on the optimum sheet size-setting display area 307, as shown in FIG. 4. FIG. 4 shows an example of a case where it is determined that B4 is the optimum sheet size. When the user clicks a sheet size-setting button 308, the determined optimum sheet size is temporarily set to the job.

An optimum page aggregation-setting display area 309 is used, when it is determined that the optimum page aggregation for the current display magnification exists, for displaying a button for setting the optimum page aggregation.

If it is determined that no optimum page aggregation for the current display magnification exists, nothing is displayed on the optimum page aggregation-setting display area 309. If it is determined that the optimum page aggregation exists, the optimum page aggregation is displayed on the optimum page aggregation-setting display area 309, as shown in FIG. 4. FIG. 4 shows an example of a case where it is determined that 2in1 for printing two pages on one sheet is the optimum page aggregation.

When the use clicks a page aggregation-setting button 310, the determined optimum page aggregation is temporarily set to the job. A page count display label 311 is used for displaying the numbers of output sheets before and after the page aggregation is changed by the page aggregation-setting button 310. This enables the user to recognize the number of sheets to be saved. When it is determined that the optimum sheet size exists, and at the same time it is determined that the optimum page aggregation exists, the buttons are displayed on both of the optimum sheet size-setting display area 307 and the optimum page aggregation-setting display area 309, respectively. For example, in the example shown in FIG. 2, when the original size is A3 and the magnification is designated to 70%, "A4" is displayed on the optimum sheet size-setting display area 307, and "2in1" is displayed on the optimum page aggregation-setting display area 309. In this case, the user can select one of the optimum sheet size and the optimum page aggregation.

An OK button 312 is used for terminating the real size preview display. When the user clicks the OK button 312, the screen 300A shown in FIG. 3 is displayed. Further, at this time, the following settings are made: First, the current display magnification is set for the job as the printing magnification. Next, the temporarily set sheet size is set for the job. Further, the temporarily set page aggregation is set for the job.

A cancel button 313 is also used for terminating the real size preview display, similarly to the OK button 312. However, when the user clicks the cancel button 313, the screen 300A is displayed without setting the printing magnification to the current display magnification. Further, neither the temporarily set sheet size nor page aggregation is set for the job.

FIG. 5 is a flowchart of a real size preview-displaying process executed by the CPU 111 appearing in FIG. 1. The real size preview-displaying process shown in FIG. 5 is executed by the CPU 111 loading a program stored in the indirect storage section 113 into the direct storage section 112.

First, the CPU 111 displays a real size preview on the user interface 114 (step S501). More specifically, the CPU 111 generates a real size preview image, further generates display data, and notifies the user interface 114 of the generated display data. The user interface 114 displays the notified display data. The step S501 is an example of the operation of a real size preview unit configured to display an image on a user interface, in the same size as the image to be actually formed on a recording medium.

Next, the CPU 111 determines whether or not to terminate the real size preview (step S502). That is, it is determined whether or not the OK button 312 or the cancel button 313 has been clicked by the user.

If it is determined in the step S502 that real size preview is not to be terminated (NO to the step S502), it is determined whether or not the optimum sheet size has been set (step S503). That is, it is determined whether or not the sheet size-setting button 308 has been clicked by the user. Note that if no optimum sheet size exists, the sheet size-setting button 308 is never clicked by the user, and hence in this case, the answer to the question of the step S503 is negative (NO).

If it is determined in the step S503 that the optimum sheet size has been set (YES to the step S503), the CPU 111 temporarily stores the set sheet size in the direct storage section (step S504), and returns to the step S502.

On the other hand, if the optimum sheet size has not been set (NO to the step S504), the CPU 111 determines whether or not the optimum page aggregation has been set (step S505). That is, it is determined whether or not the page aggregation-setting button 310 is clicked by the user. Note that if no optimum page aggregation exists, the page aggregation-setting button 310 is never clicked by the user, and hence in this case, the answer to the question of the step S505 is negative (NO).

If it is determined in the step S505 that the optimum page aggregation has been set (YES to the step S505), the CPU 111 temporarily stores the set page aggregation in the direct storage unit (step S506), and returns to the step S502.

On the other hand, if the optimum page aggregation has not been set (NO to the step S505), the CPU 111 determines whether or not the display magnification has been changed (step S507). That is, it is determined whether or not the display magnification slider 305 has been operated by the user. The step S507 is an example of an operation of a changing unit configured to enable the user to change the display size of the image displayed on the user interface.

If it is determined in the step S507 that the display magnification has not been changed (NO to the step S507), the process returns to the step S502.

On the other hand, if the display magnification has been changed (YES to the step S507), the CPU 111 updates the real size preview display according to the current display magnification (step S508). In this step, in generating the real size preview image, the same processing as the step S501 is executed except that the magnification is changed according to the display magnification.

Then, the CPU 111 determines whether or not the optimum sheet size or page aggregation for the current display magnification exists (step S509). This determination is carried out using the determination condition table 200. More specifically, the CPU 111 searches for a record in which the size of the original (image size) as an object to be displayed by the real size preview matches a value of the data item 201, and the current display magnification is within a range of ±5 with respect to a value of the printing magnification in the data item 202. If such a record is found, the answer to the question of the step S509 is affirmative (YES). Note that the values of ±5 of the range are given by way of example, and may be other values or may be configured to be changed as desired by the user.

If it is determined in the step S509 that neither the optimum sheet size nor the optimum page aggregation exists (NO to the step S509), the CPU 111 returns to the step S502. On the other hand, if the optimum sheet size or page aggregation exists (YES to the step S509), the CPU 111 displays the optimum sheet size-setting display area 307 or the optimum page aggregation-setting display area 309 according to the values in the data items 203 and 204 of the record found by the search (step S510), and then, returns to the step S502.

That is, if the data item 203 is not blank, and further, a sheet of a size indicated by the data item 203 can be fed, the optimum sheet size-setting display area 307 is displayed. Further, if the data item 204 is not blank, the optimum page aggregation-setting display area 309 is displayed.

If it is determined in the step S502 that the real size preview is to be terminated (YES to the step S502), the CPU 111 determines whether or not the settings made in the present process are to be to reflected on the job (step S511). In this step, if a button clicked by the user is the OK button 312, it is determined that the settings are to be reflected. If a button clicked by the user is the cancel button 313, it is determined that the settings are not to be reflected.

If it is determined in the step S511 that the settings are to be reflected (YES to the step S511), the CPU 111 reflects the settings on the job (step S512), followed by terminating the present process. In the step S512, the display magnification set when the OK button is clicked is set for the job as the printing magnification. Further, if the optimum sheet size has been temporarily stored in the step S504, the stored optimum sheet size is set for the job. Further, if the optimum page aggregation has been temporarily stored in the step S506, the stored optimum page aggregation is set for the job.

Therefore, in the step S512, an image formation magnification is changed which is to be applied when an image is formed on a recording medium such that the image has a size equal to a size of the image displayed at the display magnification changed by the user.

Further, according to the process shown in FIG. 5, if a size of a recording medium associated with the original size and the changed display magnification exists in the changeable size information, it is possible to form an image on the recoding medium at the changed display magnification.

Further, according to the process shown in FIG. 5, if a size of a recording medium associated with the original size and the changed display magnification exists in the aggregation-enabling size information, it is possible to form images in an aggregated manner on the recoding medium at the changed display magnification.

On the other hand, if it is determined that the setting is not reflected (NO to the step S511), the present process is terminated. When the present process is terminated, the screen 300A is displayed.

As described above, according to the present embodiment, the display magnification of the real size preview is reflected on the printing magnification. Further, the control is performed such that the optimum sheet size and page aggregation can be determined and set according to a change in the display magnification (printing magnification). This makes it possible to operate the image forming apparatus without switching many times between a screen for displaying the real size preview and screens for setting the magnification, the sheet size, and the page aggregation, which improves user-friendliness.

Further, the image formation magnification is changed which is to be applied when an image is formed on a recording medium such that the image has a size equal to a size of the image displayed at the display magnification changed by the user. This makes it possible to reduces user's time and effort required for forming the image on the recording medium, compared with the conventional technique.

Although in the present embodiment described above, the image processing unit and the printing apparatus form the image forming apparatus which is a single or stand-alone apparatus, this is not limitative, but the image processing unit may include a PC (personal computer), a cellular phone terminal, or the like, insofar as it has the above-described functions of the image processing unit of the present embodiment and controls the printing unit. In this case, the image processing unit is provided separately from the printing unit, and can communicate with the printing unit by desired wireless communication, such as wireless LAN, or desired wired communication, such as the Ethernet (registered trademark).

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-188978, filed Aug. 31, 2011, which is hereby incorporated by reference herein in its entirety.

What is claimed is:

1. An image forming apparatus comprising:
a forming unit configured to form an image on a recording medium;
a display unit configured to display information;
a real size preview unit configured to display the image on the display unit in substantially the same size as a size of an image to be formed on a recording medium of a first size by the forming unit;
a first changing unit configured to enable a user to change the display size of the image displayed on the display unit by the real size preview unit; and
a second changing unit configured to change the size of the recording medium, on which the image is to be formed by the forming unit, to a second size different from the first size, based on the display size changed by the first changing unit,
wherein the forming unit forms the image on the recording medium having the second size changed by the second changing unit.

2. The image forming apparatus according to claim 1, further comprising a storage unit configured to store size information in which original sizes, which are predetermined sizes of recording media for images, and display sizes changed by the first changing unit are associated with sizes of recording media which are suitable for the images to be formed at the display size, respectively,
wherein when the size of the recording medium associated with the original size and the changed display size exist in the size information stored in the storage unit, the second changing unit changes the size of the recording medium.

3. The image forming apparatus according to claim 1, further comprising a storage unit configured to store size information in which for use in printing a plurality of images, original sizes, which are predetermined sizes of recording media for images, and display sizes changed by the first changing unit are associated with sizes of recording media which are suitable for two or more images to be formed in an aggregated manner on one recording medium at the changed display sizes, respectively,
wherein when the size of the recording medium associated with the original size and the changed display size exist in the size information stored in the storage unit, the second changing unit selects the size of the recording medium.

4. The image forming apparatus according to claim 1, further comprising an inquiry unit configured to make an inquiry of the user whether or not to change the size of the recording medium, based on the display size changed by the first changing unit,
wherein the second changing unit changes the size of the recording medium, on which the image is to be formed by the forming unit, from the first size to the second size according to an instruction for changing the size of the recording medium to the second size, which is given by the user as a result of the inquiry.

5. An image forming apparatus comprising:
a forming unit configured to form an image on a recording medium;
a display unit configured to display information;
a real size preview unit configured to display an object included in the image on the display unit in substantially the same size as a size of an object included in the image to be formed on a recording medium of a first size by the forming unit;
a first changing unit configured to change a forming magnification of the image based on a user's operation to the image displayed on the display unit by the real size preview unit; and
a second changing unit configured to change the size of the recording medium, on which the image is to be formed by the forming unit, to a second size different from the first size, based on the forming magnification changed by the first changing unit; and
a control unit configured to cause the forming unit to form the image on the recording medium having the second size changed by the second changing unit.

6. The image forming apparatus according to claim 5, further comprising a storage unit configured to store size information in which original sizes, which are predetermined sizes of recording media for images, and forming magnifications changed by the first changing unit are associated with sizes of recording media which are suitable for the images to be formed at the forming magnification, respectively, and
wherein when the size of the recording medium associated with the original size and the changed forming magnification exist in the size information stored in the storage unit, the second changing unit changes the size of the recording medium.

7. The image forming apparatus according to claim 5, further comprising a storage unit configured to store size information in which for use in forming a plurality of images, original sizes, which are predetermined sizes of recording media for images, and forming magnifications changed by the first changing unit are associated with sizes of recording media which are suitable for two or more images to be formed in an aggregated manner on one recording medium at the changed forming magnifications, respectively, and
wherein when the size of the recording medium associated with the original size and the changed forming magnification exist in the size information stored in the storage unit, the second changing unit selects the size of the recording medium.

8. The image forming apparatus according to claim 5, further comprising an inquiry unit configured to make an inquiry of the user whether or not to change the size of the recording medium, based on the forming magnification changed by the first changing unit,
wherein the second changing unit changes the size of the recording medium, on which the image is to be formed by the forming unit, from the first size to the second size according to an instruction for changing the size of the recording medium to the second size, which is given by the user as a result of the inquiry.

9. A method of controlling an image forming apparatus including a forming unit configured to form an image on a recording medium, and a display unit configured to display information, the method comprising:
displaying the image on the display unit in substantially the same size as a size of an image to be formed on a recording medium of a first size by the forming unit;
enabling a user to change the display size of the image displayed on the display unit;
changing the size of the recording medium, on which the image is to be formed by the forming unit, to a second size different from the first size, based on the display size changed by the user; and
causing the forming unit to form the image on the recording medium having the second size.

10. The method according to claim 9, wherein the image forming apparatus includes a storage unit configured to store size information in which original sizes, which are predetermined sizes of recording media for images, and changed display sizes are associated with sizes of recording media which are suitable for the images to be formed at the display size, respectively, and
wherein when the size of the recording medium associated with the original size and the changed display size exist in the size information stored in the storage unit, the size of the recording medium is changed.

11. The method according to claim 9, wherein the image forming apparatus includes a storage unit configured to store size information in which for use in printing a plurality of images, original sizes, which are predetermined sizes of recording media for images, and changed display sizes are associated with sizes of recording media which are suitable for two or more images to be formed in an aggregated manner on one recording medium at the changed display sizes, respectively, and
wherein when the size of the recording medium associated with the original size and the changed display size exist in the size information stored in the storage unit, the size of the recording medium is changed.

12. The method according to claim 9, further comprising making an inquiry of the user whether or not to change the size of the recording medium, based on the changed display size,
wherein the changing includes changing the size of the recording medium, on which the image is to be formed by the forming unit, from the first size to the second size according to an instruction for changing the size of the recording medium to the second size, which is given by the user as a result of the inquiry.

13. A method of controlling an image forming apparatus that includes a display unit configured to display information, and can communicate with a forming unit configured to form an image on a recording medium, the method comprising:
displaying the image on the display unit in substantially the same size as a size of an image to be formed on a recording medium of a first size by the forming unit;
changing a forming magnification of the image based on a user's operation to the image displayed on the display unit;
changing the size of the recording medium, on which the image is to be formed by the forming unit, to a second size different from the first size, based on the forming magnification changed by the user; and
causing the forming unit to form the image on the recording medium having the second size.

14. The method according to claim 13, further comprising storing size information in which original sizes, which are predetermined sizes of recording media for images, and forming magnifications changed by the first changing unit are associated with sizes of recording media which are suitable for the images to be formed at the forming magnification, respectively, and
wherein when the size of the recording medium associated with the original size and the changed forming magnification exist in the stored size information, the size of the recording medium is changed.

15. The method according to claim 13, further comprising storing size information in which for use in forming a plurality of images, original sizes, which are predetermined sizes of recording media for images, and forming magnifications changed by the first changing unit are associated with sizes of recording media which are suitable for two or more images to be formed in an aggregated manner on one recording medium at the changed forming magnifications, respectively, and
   wherein when the size of the recording medium associated with the original size and the changed forming magnification exist in the stored size information, the size of the recording medium is changed.

16. The method according to claim 13, further comprising making an inquiry of the user whether or not to change the size of the recording medium, based on the forming magnification changed by the first changing unit,
   wherein there is changed the size of the recording medium, on which the image is to be formed by the forming unit, from the first size to the second size according to an instruction for changing the size of the recording medium to the second size, which is given by the user as a result of the inquiry.

17. A non-transitory computer-readable storage medium storing a computer-executable program for causing a computer to execute a method of controlling an image forming apparatus including a forming unit configured to form an image on a recording medium, and a display unit configured to display information, wherein the method comprises:
   displaying the image on the display unit in substantially the same size as a size of an image to be formed on a recording medium of a first size by the forming unit;
   changing a forming magnification of the image based on a user's operation to the image displayed on the display unit;
   changing the size of the recording medium, on which the image is to be formed by the forming unit, to a second size different from the first size, based on the forming magnification changed by the user; and
   causing the forming unit to form the image on the recording medium having the second size.

18. A non-transitory computer-readable storage medium storing a computer-executable program for causing a computer to execute a method of controlling an image forming apparatus that includes a display unit configured to display information, and can communicate with a forming unit configured to form an image on a recording medium, wherein the method comprises:
   displaying the image on the display unit in substantially the same size as a size of an image to be formed on a recording medium of a first size by the forming unit;
   enabling a user to change the display size of the image displayed on the display unit;
   changing the size of the recording medium, on which the image is to be formed by the forming unit, to a second size different from the first size, based on the display size changed by the user; and
   causing the forming unit to form the image on the recording medium having the second size.

* * * * *